(12) United States Patent
Kumar et al.

(10) Patent No.: US 11,441,694 B2
(45) Date of Patent: Sep. 13, 2022

(54) SOLENOID CONTROLLED VALVE ASSEMBLY INCLUDING A POPPET AND DIAPHRAGM

(71) Applicants: Viraraghavan S. Kumar, Melbourne, FL (US); Sudhir S. Kulkami, Rockledge, FL (US); Shailesh Pradhananga, Rockledge, FL (US)

(72) Inventors: Viraraghavan S. Kumar, Melbourne, FL (US); Sudhir S. Kulkami, Rockledge, FL (US); Shailesh Pradhananga, Rockledge, FL (US)

( * ) Notice: Subject to any disclaimer, the term of this patent is extended or adjusted under 35 U.S.C. 154(b) by 0 days.

(21) Appl. No.: 15/883,084

(22) Filed: Jan. 29, 2018

(65) Prior Publication Data

US 2019/0032809 A1    Jan. 31, 2019

Related U.S. Application Data

(63) Continuation-in-part of application No. 14/683,809, filed on Apr. 10, 2015, now Pat. No. 9,879,797.

(Continued)

(51) Int. Cl.
*F16K 31/08* (2006.01)
*F16K 1/32* (2006.01)
*F16K 31/06* (2006.01)

(52) U.S. Cl.
CPC ............... *F16K 31/08* (2013.01); *F16K 1/32* (2013.01); *F16K 31/0655* (2013.01); *F16K 31/0675* (2013.01); *F16K 31/082* (2013.01)

(58) Field of Classification Search
CPC .. F16K 31/08; F16K 31/0655; F16K 31/0675; F16K 31/082; F16K 31/0603;
(Continued)

(56) References Cited

U.S. PATENT DOCUMENTS 3,134,932 A * 5/1964 Ray ........................ H01F 7/12
335/257
3,241,005 A * 3/1966 Morris, Jr. ............ H01F 7/1607
335/261

(Continued)

*Primary Examiner* — Daphne M Barry
(74) *Attorney, Agent, or Firm* — The Bilicki Law Firm, PC; James A. Cairns

(57) ABSTRACT

A proportional solenoid-controlled fluid valve assembly having a fluid pressure balancing arrangement includes a poppet and diaphragm. The valve assembly also includes a solenoid coil assembly having a cylindrical conduit and a magnetic orifice piece positioned within the conduit. A plunger is positioned within the conduit and is movable within the conduit between a de-actuated position and an actuated position. A valve poppet is provided having a top cylindrical upstanding portion and a poppet face configured to abut the valve seat. Further, a diaphragm is positioned within the valve base with the top cylindrical upstanding portion of the poppet extending through a diaphragm opening. A magnetic frame is also included for securing the valve assembly in an assembled configuration, wherein a magnetic path is formed by magnetic orifice piece, plunger and the magnetic frame and the solenoid coil is configured to be actuated such that the plunger moves towards the magnetic orifice piece, thus lifting the poppet and allowing pressurized media to pass from the inlet port to the outlet port.

17 Claims, 21 Drawing Sheets

Related U.S. Application Data

(60) Provisional application No. 62/503,287, filed on May 8, 2017.

(58) Field of Classification Search
CPC ............ F16K 31/0686; F16K 31/0651; F16K 31/0672; F16K 31/0693; F16K 39/022; F16K 7/123; F16K 31/0624; H01F 7/06; H01F 7/1607; H01F 2007/086; Y10T 137/86614
See application file for complete search history.

(56) References Cited

U.S. PATENT DOCUMENTS

| | | | |
|---|---|---|---|
| 4,445,528 A * | 5/1984 | Miki | ..................... F16K 31/426 137/315.03 |
| 4,782,862 A | 11/1988 | Nguyen et al. | |
| 4,844,112 A | 7/1989 | Pick et al. | |
| 4,858,886 A | 8/1989 | Tatara | |
| 5,810,030 A * | 9/1998 | Uchiyama | ........... F16K 31/0655 137/468 |
| 6,076,550 A | 6/2000 | Hiraishi et al. | |
| 6,149,124 A | 11/2000 | Yang | |
| 8,430,378 B2 | 4/2013 | Hutchings et al. | |
| 10,228,072 B1 * | 3/2019 | Tinholt | ................. F16K 3/0218 |
| 2005/0145812 A1 | 7/2005 | Kumar | |
| 2005/0184261 A1 | 8/2005 | Stern | |
| 2006/0011878 A1 * | 1/2006 | Denyer | ............... F16K 31/0675 251/129.08 |
| 2006/0086396 A1 * | 4/2006 | Ando | .................... H01F 7/1607 137/625.65 |
| 2009/0294712 A1 * | 12/2009 | Hutchings | ........... F16K 31/0672 251/129.15 |
| 2018/0172176 A1 | 6/2018 | Kumar | |

* cited by examiner

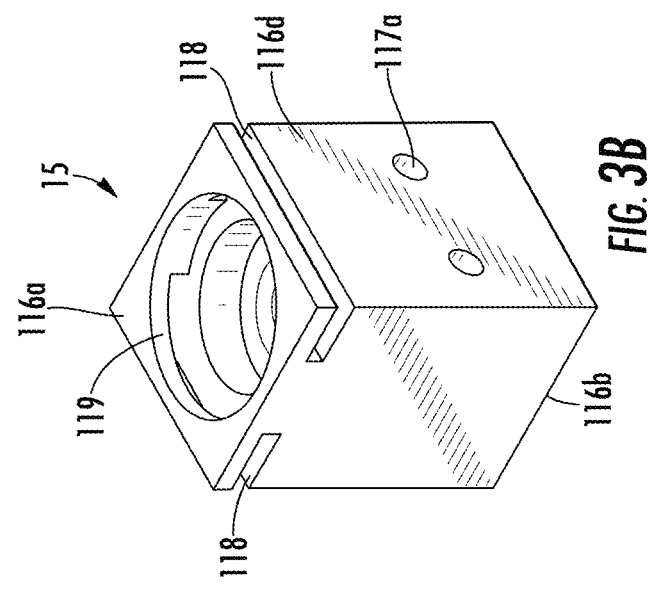
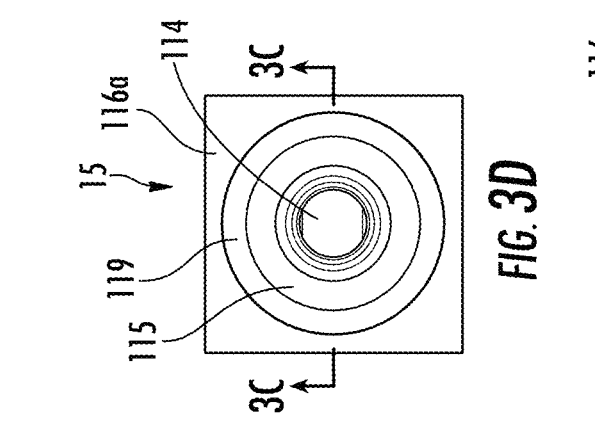
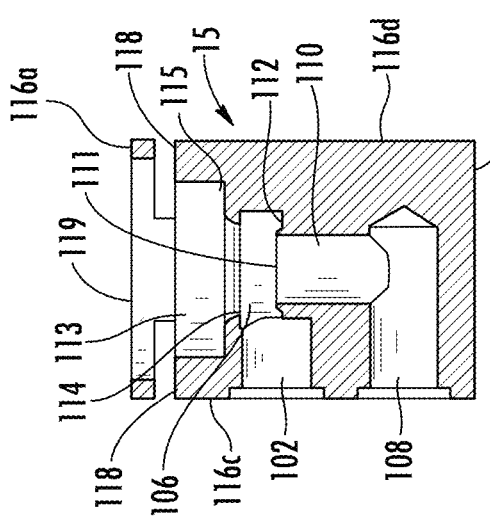
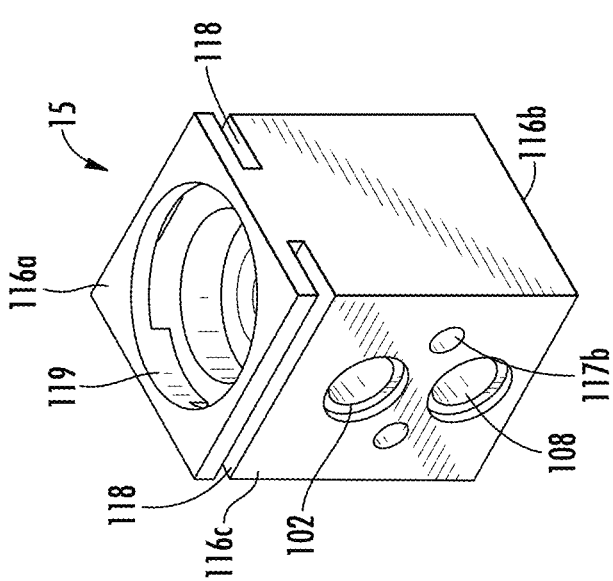
FIG. 3B
FIG. 3D
FIG. 3C
FIG. 3A

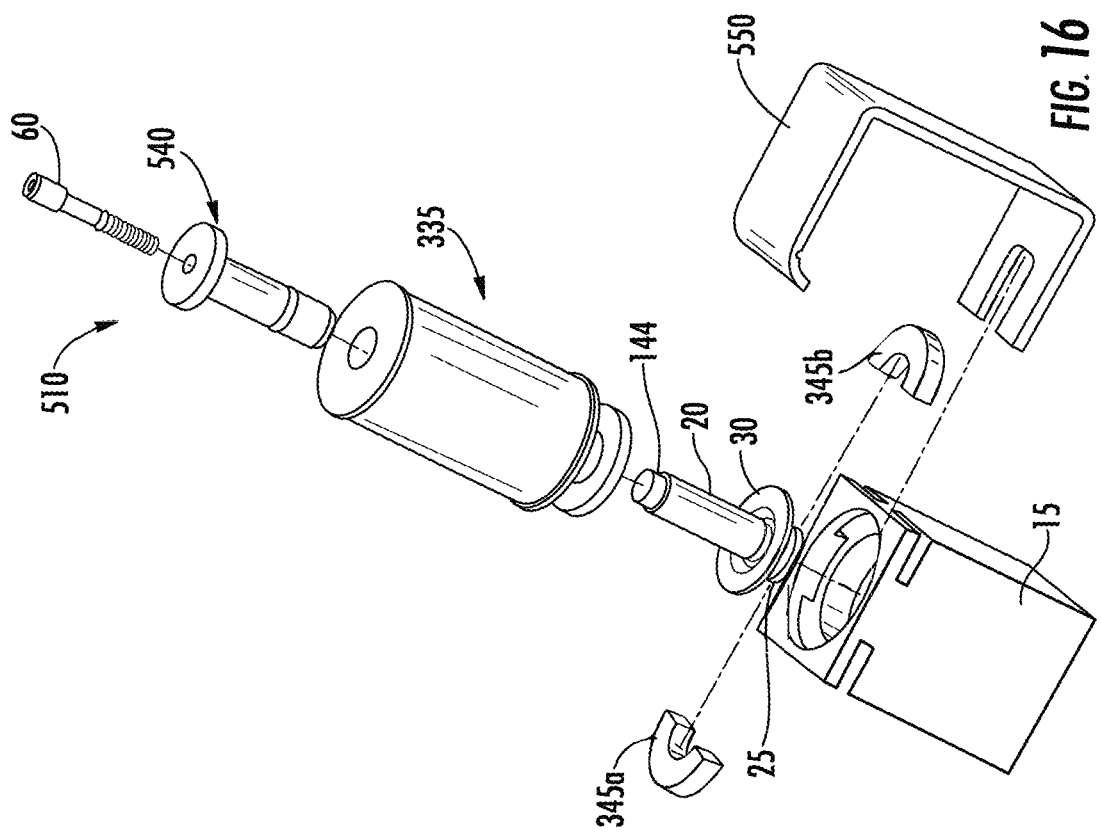
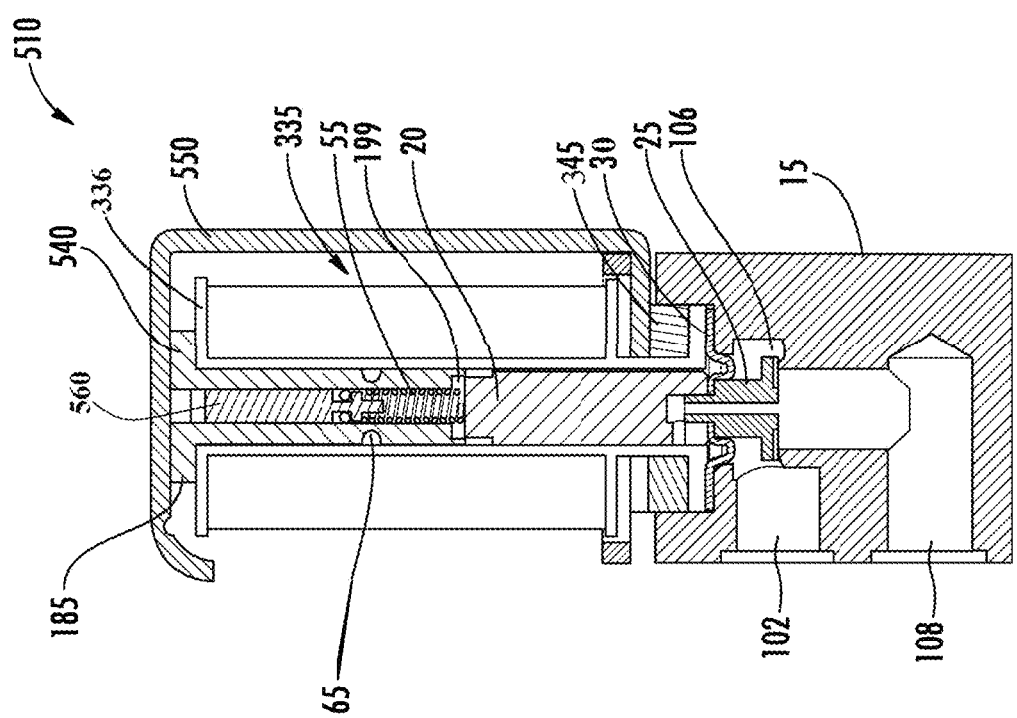

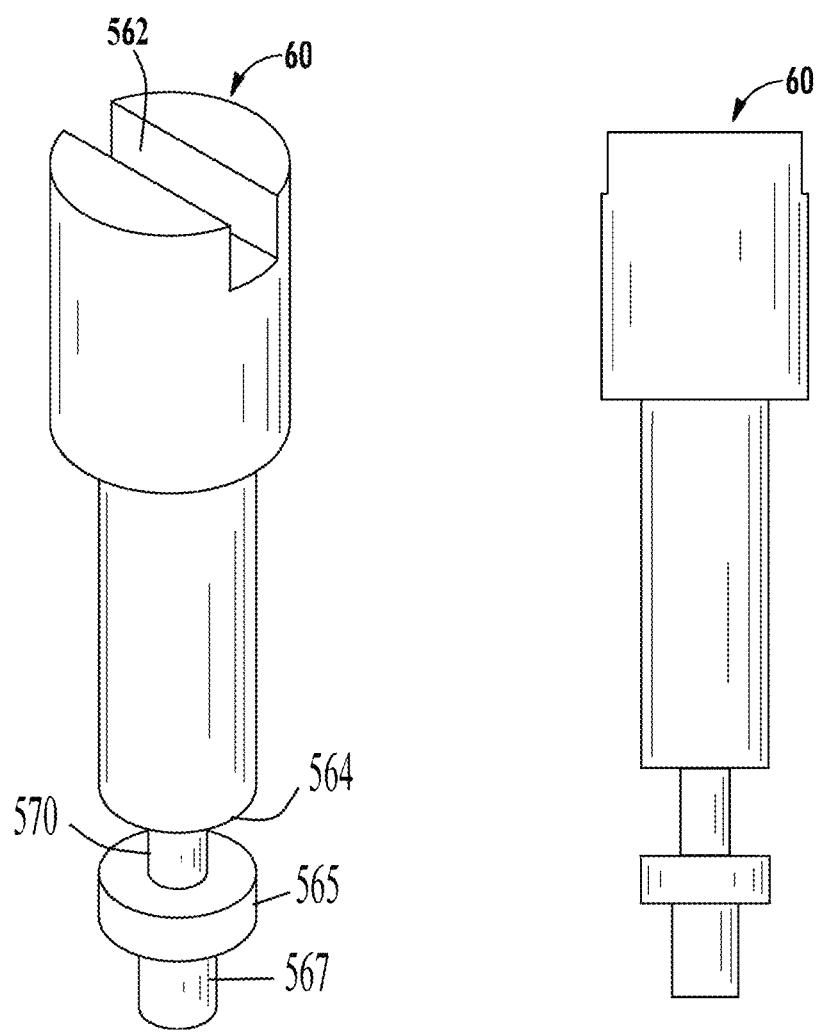

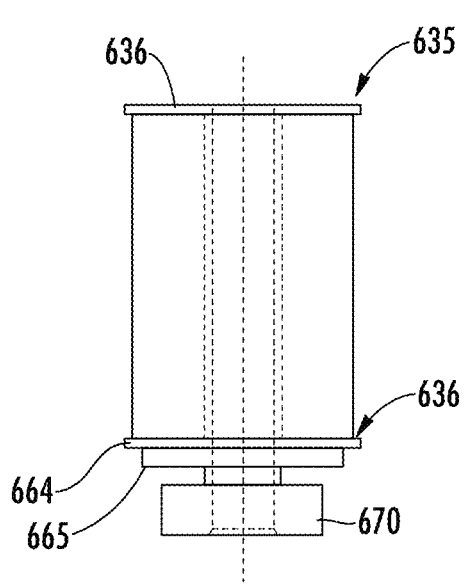
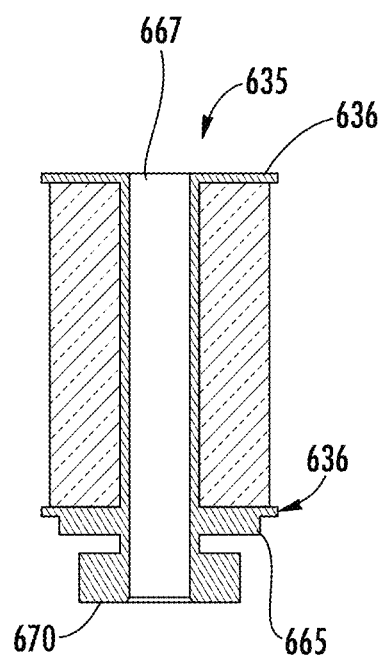
FIG. 20A
FIG. 20B

SOLENOID CONTROLLED VALVE ASSEMBLY INCLUDING A POPPET AND DIAPHRAGM

FIELD OF INVENTION

The present application relates in general to solenoid-actuated fluid control valves for use in fluid flow regulation systems, such as those that require precise control of the rate of fluid flow, including but not limited to pneumatic and hydraulic regulation.

BRIEF DESCRIPTION OF THE DRAWINGS

FIGS. 3A-3D illustrate perspective front, perspective back, cross-sectional, and top views of a valve base.

FIGS. 15 and 16 illustrate cross-sectional and exploded views of an additional embodiment of a valve assembly 510 with a modified adjustment screw and magnetic frame.

FIGS. 17A and 17B are enlarged perspective and side views of an adjustment screw.

FIGS. 20a and 20b are side and cross-sectional views of a bobbin with a coil winding of valve assembly 610.

BRIEF SUMMARY

Figure 1:
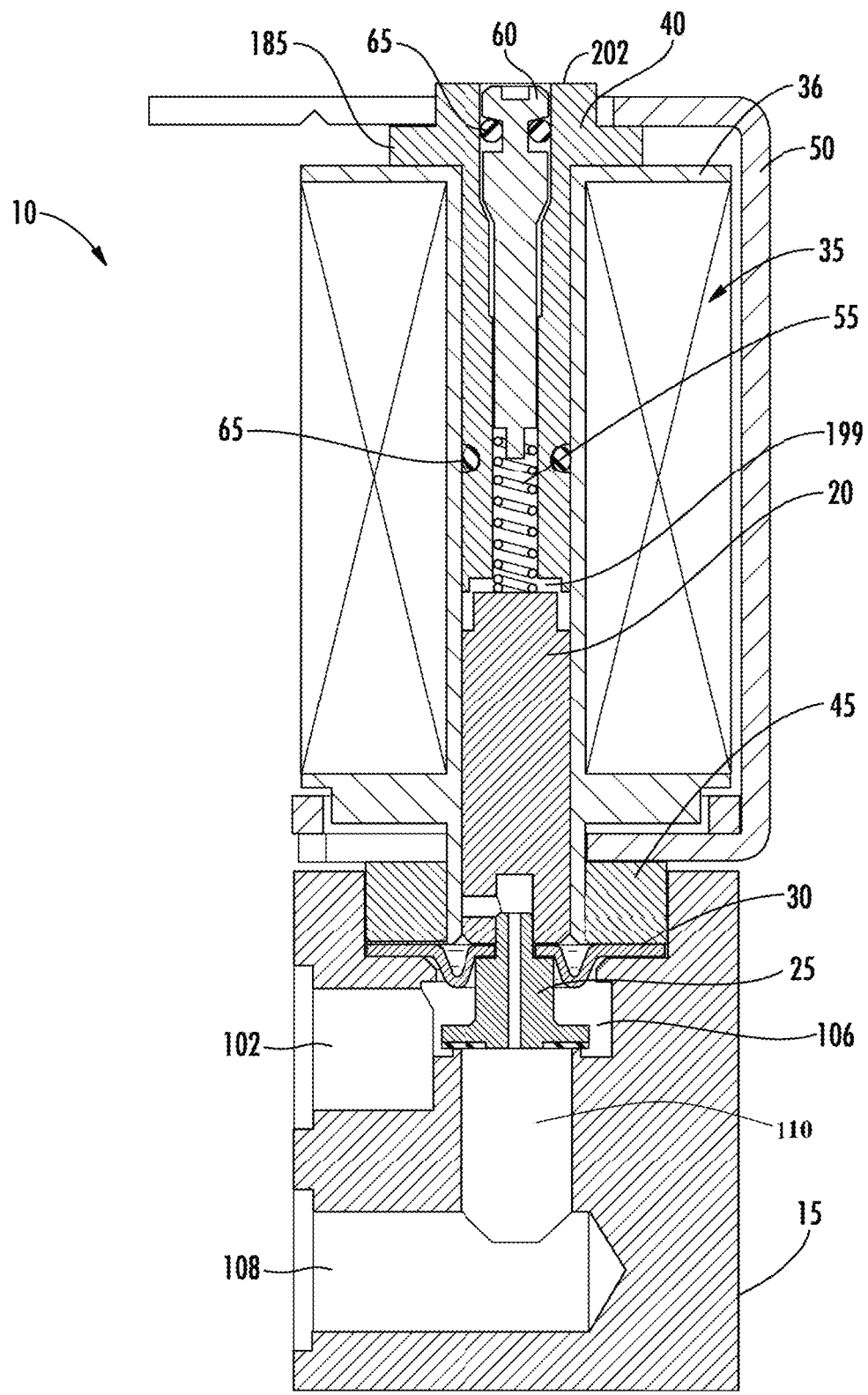
FIG. 1. is an assembled cross-sectional view of a pressure balancing valve.

A proportional solenoid-controlled fluid valve assembly having a fluid pressure balancing arrangement according to the embodiments described herein is designed such that balancing and sealing are achieved with a poppet and diaphragm. The valve assembly includes a valve base having an upper cavity forming an annular ledge, a fluid inlet port and an outlet port with an internal passageway and interior valve cavity there between, with the internal passageway terminating at a valve seat. The valve assembly also includes a solenoid coil assembly having a cylindrical conduit and a magnetic orifice piece positioned within the conduit. A plunger is positioned within the conduit and is movable within the conduit between a de-actuated position and an actuated position. A valve poppet is provided having a top cylindrical upstanding portion and a poppet face configured to abut the valve seat. Further, the valve assembly includes a diaphragm having a top side, a bottom side, an outer annular flange portion, and an inner annular flange terminating at a diaphragm opening, said diaphragm being positioned within valve base with said outer annular flange portion abutting the ledge of the valve base and the top cylindrical upstanding portion of the poppet extending through the diaphragm opening. A magnetic frame is also included for securing the valve assembly in an assembled configuration, wherein a magnetic path is formed by magnetic orifice piece, plunger and the magnetic frame and the solenoid coil is configured to be actuated such that the plunger moves towards the magnetic orifice piece, thus lifting the poppet and allowing pressurized media to pass from the inlet port to the outlet port.

In some embodiments, the plunger includes a fluid flow passageway formed therein and the poppet includes a fluid flow passageway formed therein to allow pressurized media from the inlet port to pass to the top side of the diaphragm and fill a cavity around the plunger, wherein the diaphragm acts as a pressure balance to balance a force that is exerted on the poppet from the pressurized media from the inlet port and a force that is exerted on the top of the diaphragm.

DETAILED DESCRIPTION

The valve assemblies described in the present disclosure are proportional solenoid-controlled fluid valves having a fluid pressure balancing arrangement designed such that balancing and sealing are achieved with a poppet and diaphragm. Valves described in the present disclosure are designed to be easy to assemble and use fewer fasteners and threaded members. Fewer parts and lower wattage are required to achieve the valve function as compared with other valves. In operation, a force results from the pressure acting on a bottom side of the poppet is balanced by a force resulting from pressure acting on a top side of the diaphragm. Due to proper force balancing, the solenoid may operate at low wattage as it only has to overcome a spring force. The components and mechanisms of pressure balancing valve assembly 10 are described in detail below.

Figure 2A:
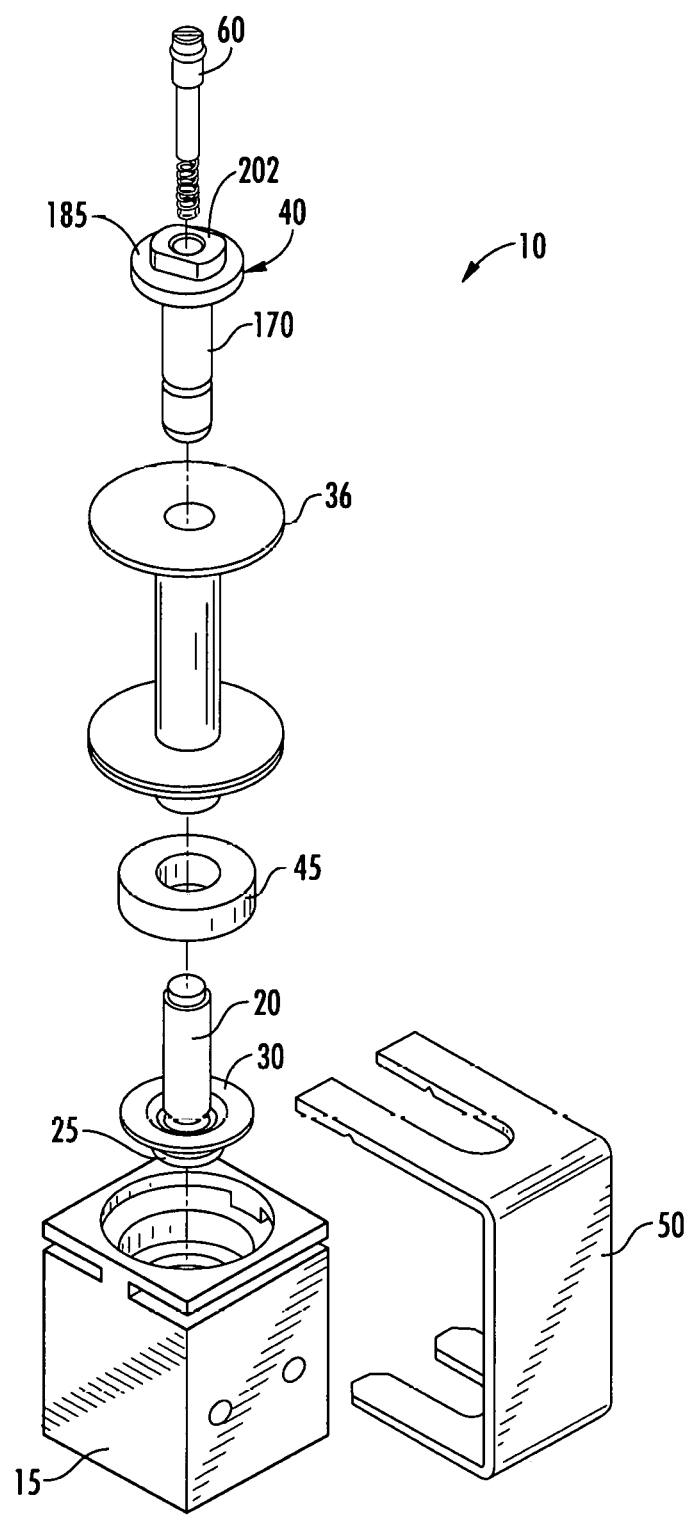
FIG. 2A is an exploded view of the pressure balancing valve of FIG. 1.
Figure 2B:
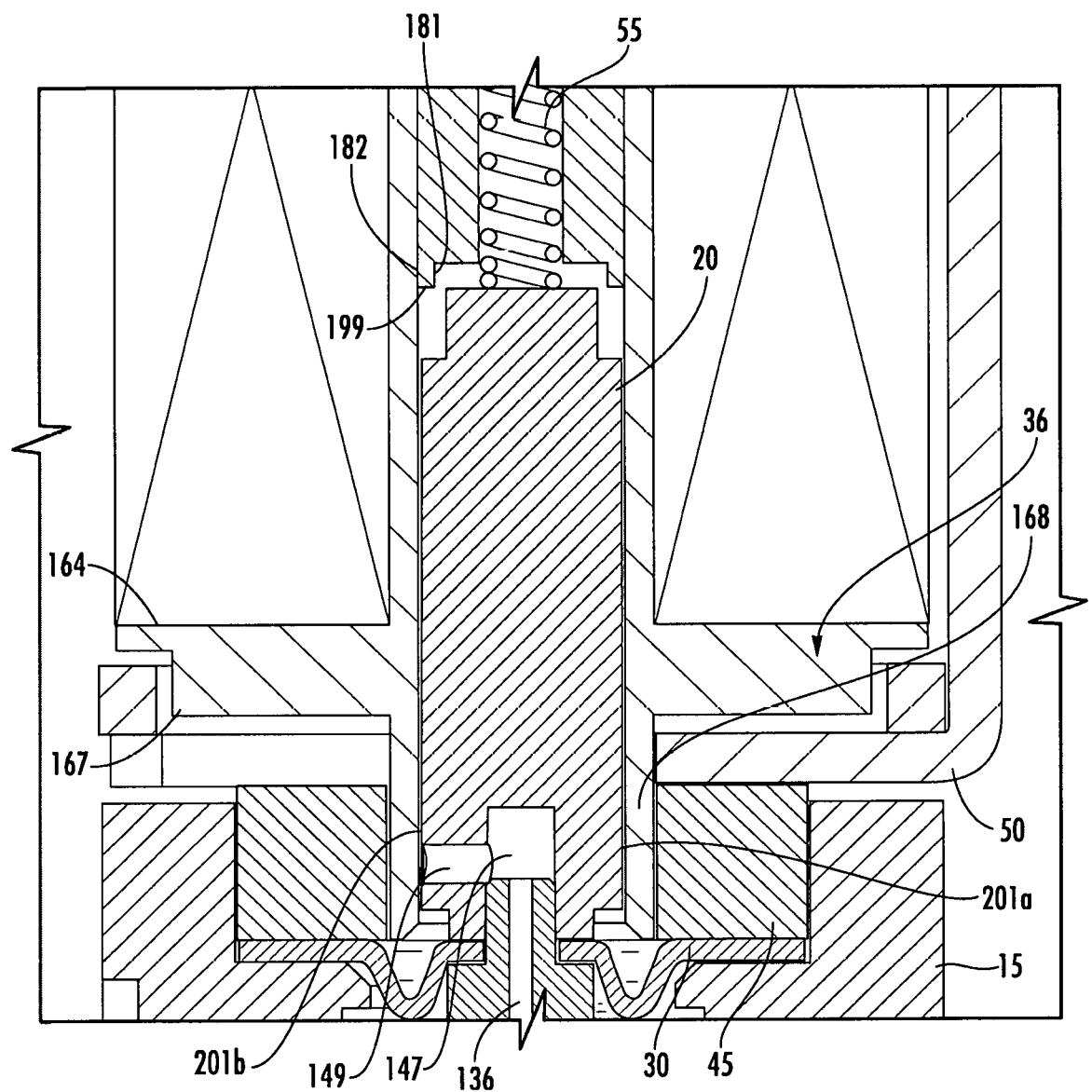
FIG. 2B is an enlarged, cross-sectional view of the pressure balancing valve of FIG. 1.

FIG. 1 is a cross-sectional view of valve assembly 10. FIG. 2A is an exploded view of valve assembly 10 and FIG. 2B is an enlarged view of a portion of valve assembly 10 showing radial gaps. Valve assembly 10 includes a vase base 15, a plunger 20, a valve poppet 25, a diaphragm 30, a solenoid coil assembly 35, a magnetic orifice piece 40, a ring 45, a magnetic frame 50, a spring 55, an adjustment screw 60, and one or more O-rings 65. In the embodiment of FIG. 1, valve assembly 10 allows pressurized media from a fluid inlet port 108 to pass through interior valve bore 110, thereby exerting pressure on a bottom of valve poppet 25 towards a hole in valve poppet 25 and plunger 20. This allows the pressurized media from inlet port 108 to pass to the top side of diaphragm 30, filing a cavity around plunger 20. In this case, diaphragm 30 acts as a pressure balance, balancing the force that is exerted on valve poppet 25 due the pressurized media passing through orifice 111 and the force that is exerted on top of the diaphragm 30. The balancing diaphragm 30 acts such that the solenoid coil requires less energy to actuate, allowing it to operate at very low wattage. When a solenoid coil of solenoid coil assembly 35 is actuated, plunger 20 is attracted towards the magnetic orifice piece 40 and moves to close air gap 199 by overcoming the bias of spring 55, thus lifting valve poppet 25 which, in turn, allows the pressurized media to pass from inlet port 108 to outlet port 102. Magnetic orifice piece 40 includes a disk-shaped rim portion 185 extending outwardly therefrom and a top extension 202 for fitting within a slot of magnetic frame 50 to secure the valve assembly 10 and prevent rotation.

As illustrated by the exploded view shown in FIG. 2A, valve assembly can be assembled by attaching valve poppet 25 and diaphragm 30 to plunger 20. Valve poppet 25, diaphragm 30, and plunger 20 are then placed into a cavity 113 of valve base 15 such that an outer portion of diaphragm 30 contacts a cavity annular ledge 115. Ring 45 is then placed over plunger 20 such that ring 45 contacts a top side of diaphragm 30. A bobbin 36 of solenoid coil assembly (coil not shown) is then placed over plunger 20 and ring 45. Magnetic orifice piece 40 is then inserted into bobbin 36 and an adjustment screw 60 is inserted to help secure the assembly. Magnetic frame 50 is then attached to secure the valve assembly in an assembled configuration.

The components of valve assembly 10 will be described in detail with respect to FIGS. 3A-9B. FIGS. 3A-3D illustrate perspective front, perspective back, cross-sectional, and top views of valve base 15. Valve base 15 may be formed of plastic, aluminum, machined steel, or the like and includes a fluid input port 108 and fluid exit port 102. Within valve base 15, fluid inlet port 108 is coupled to an interior valve cavity 106. Fluid exit port 102 is coupled to a first generally cylindrical interior valve bore 110 that extends to a valve orifice 111, which is surrounded by a generally circular valve seat 112. Valve orifice 111 of interior valve bore 110 opens into interior valve cavity 106 in which a valve poppet 25 is retained. Valve base 15 also includes a cavity 113 connected to interior valve cavity 106 by a connecting channel 114. Cavity 113 forms an annular ledge 115. Valve base 15 includes a top end 116a, a bottom end 116b, a port side 116c and a back side 116d having apertures 117a formed therein. Apertures 117b are also provided on port 116c. Further, slots 118 are formed within port 116c and back side 116d of valve base 15 adjacent to top end 116a to allow for insertion of magnetic frame 50. An annular opening 119 is also formed within top end 116a of valve base 15.

Figure 4A:
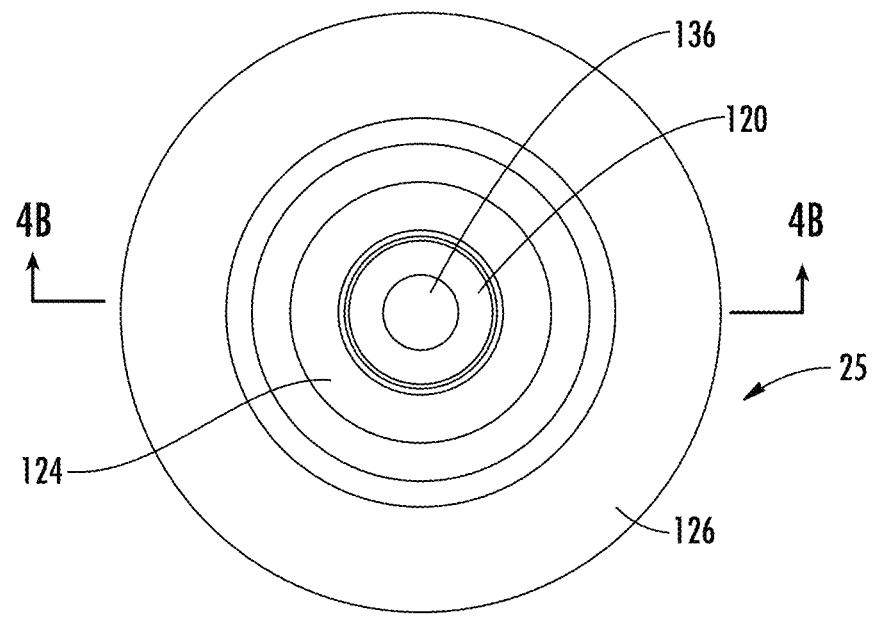
FIGS. 4A and 4B are top and cross-sectional views of a valve poppet.
Figure 4B:
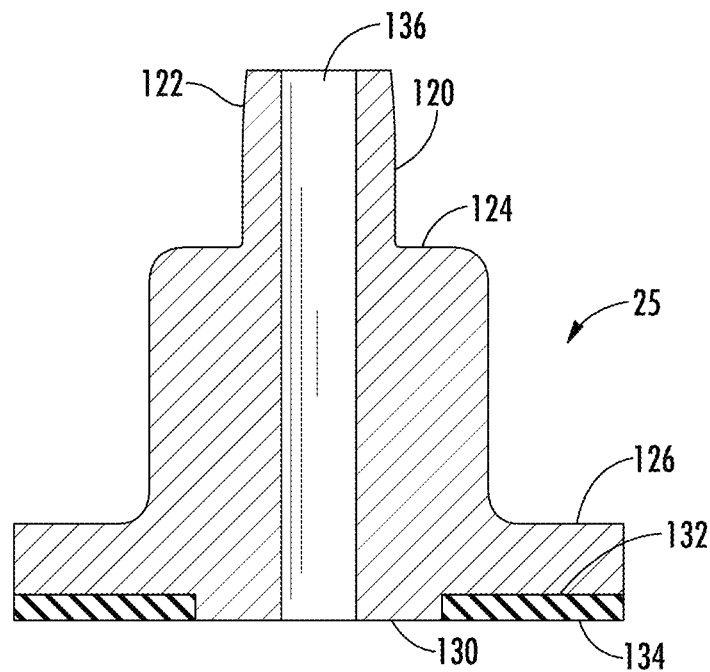

FIGS. 4A and 4B are top and cross-sectional views of valve poppet 25. Materials used for forming valve poppet 25 include elastomeric materials. As shown in FIG. 4B, valve poppet 25 includes a generally stepped cylindrical body having a top cylindrical upstanding portion 120 with an inwardly tapered end 122, a stepped ledge portion 124 and a lower flange portion 126 which terminates at a lower generally circular poppet face 130. Poppet face 130 has an annular depression 132, into which a fluid tight annular sealing ring 134, such as an annular shaped elastomeric ring, may be present. Sealing ring 134 is sized to cover and thereby seal valve poppet 25 against valve seat 116. Valve poppet 25 also includes interior axial bore 136. Cylindrical upstanding portion 120 is generally sized to engage with plunger 20, as will be described below.

Figure 5A:
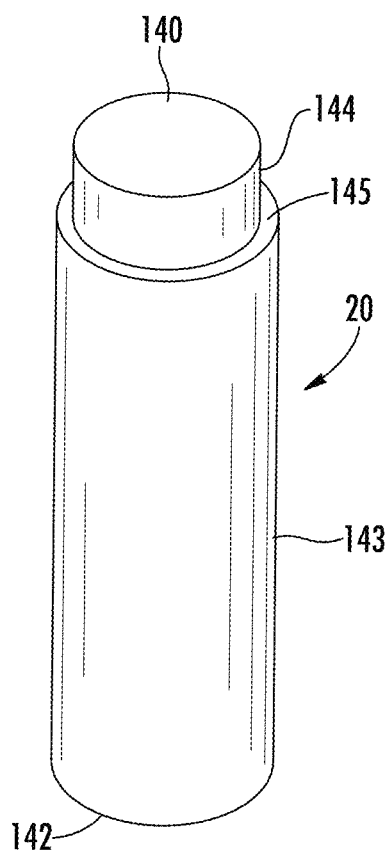
FIGS. 5A-5C are perspective, side and cross-sectional views of plunger.
Figure 5B:
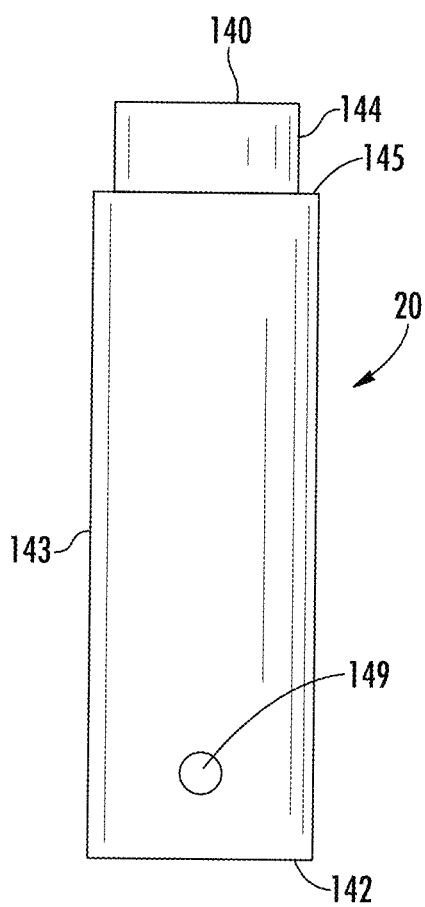
Figure 5C:
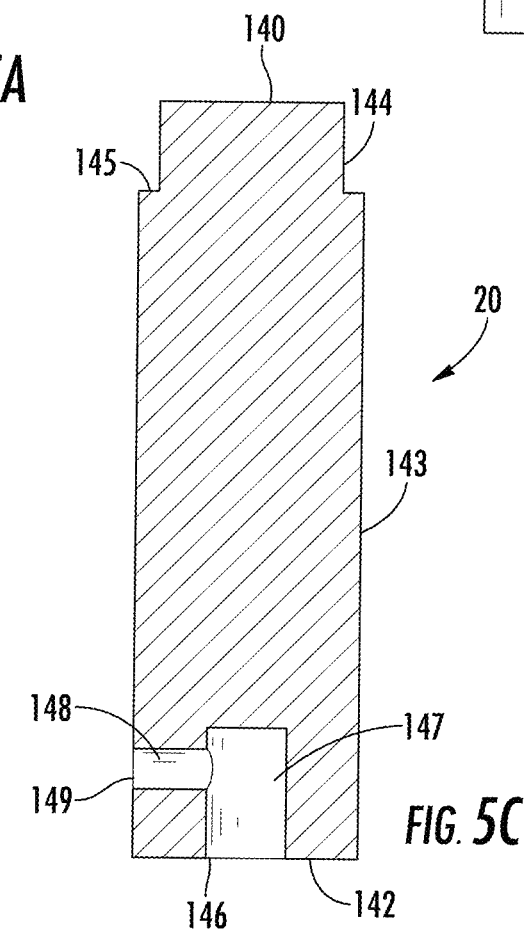

Perspective, side and cross-sectional views of plunger 20 are shown in FIGS. 5A-5C. Plunger 20 includes a first end 140 and a second end 142 with a generally cylindrical side wall 143 having a narrowed cylindrical section 144 and ledge 145 formed at first end 140. Second end includes an aperture 146 leading to a fluid passageway 147 and a side port 148, which terminates at a side opening 149 of formed in cylindrical side wall 143.

Figure 6A:
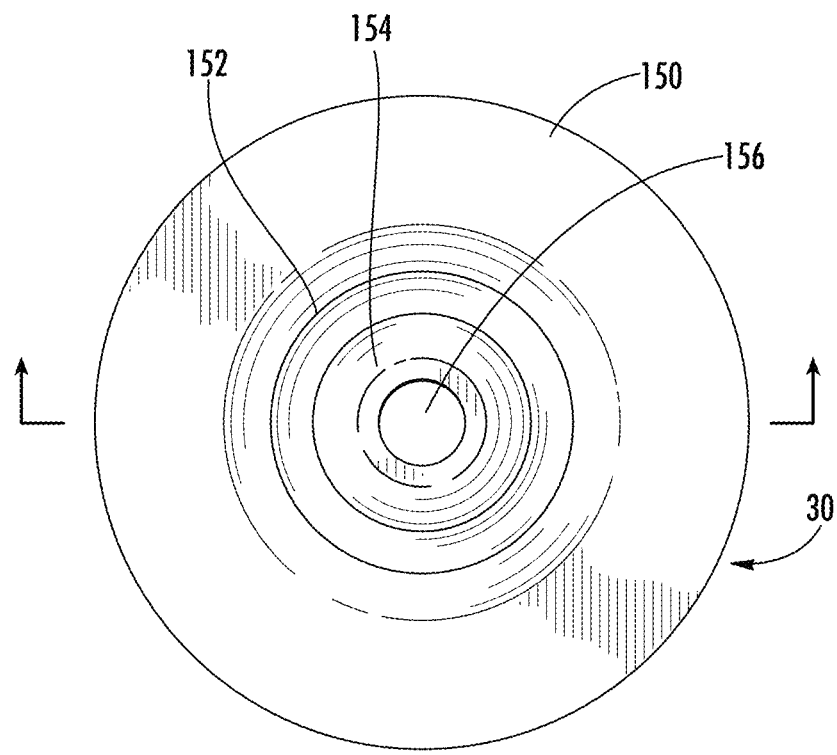
FIGS. 6A and 6B are top and cross-sectional views of a diaphragm.
Figure 6B:
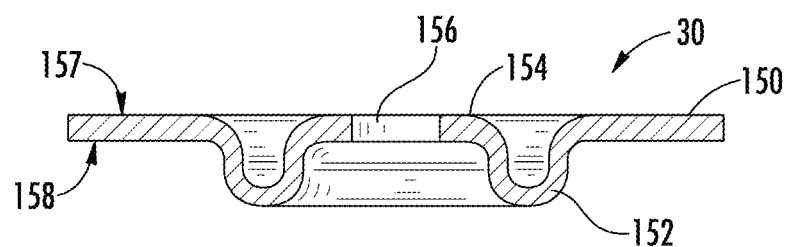

Top and cross-sectional views of diaphragm 30 are shown in FIGS. 6A and 6B. Diaphragm 30 is formed from an elastomeric material and includes an outer annular flange portion 150, an annular generally U-shaped portion 152, and an inner annular flange 154, which terminates at a diaphragm opening 156. Diaphragm 30 also generally includes a top side 157 and a bottom side 158. During assembly of valve 10, diaphragm 30 is positioned within valve base 15 such that outer annular flange portion 150 of diaphragm 30 contacts ledge 115 of valve base 15. Generally U-shaped portion 152 of diaphragm 30 extends downwardly through connecting channel 114 towards interior valve cavity 106. Inner annular flange 154 stepped ledge portion 124 of valve poppet 25 and top cylindrical upstanding portion 120 of valve poppet 25 extends through diaphragm opening 156.

Figure 7A:
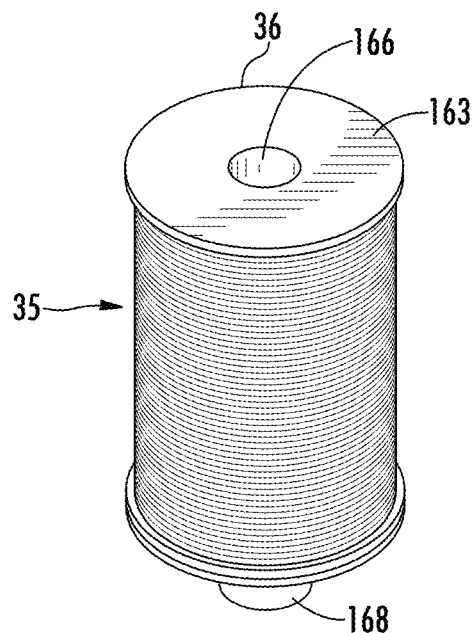
FIGS. 7A and 7B illustrate perspective and cross-sectional views of a solenoid assembly having a bobbin and solenoid coil.
Figure 7B:
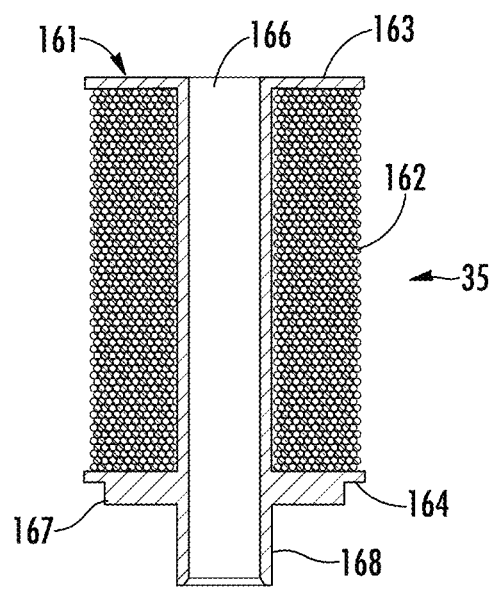
Figure 7C:
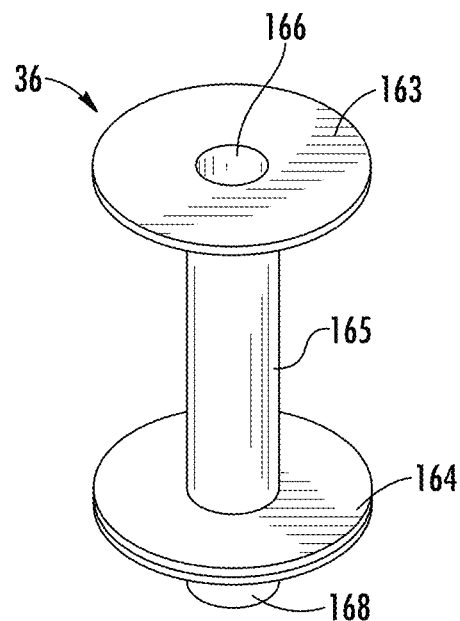
FIGS. 7C and 7D illustrate perspective and cross-sectional views of a bobbin without solenoid coil attached.
Figure 7D:
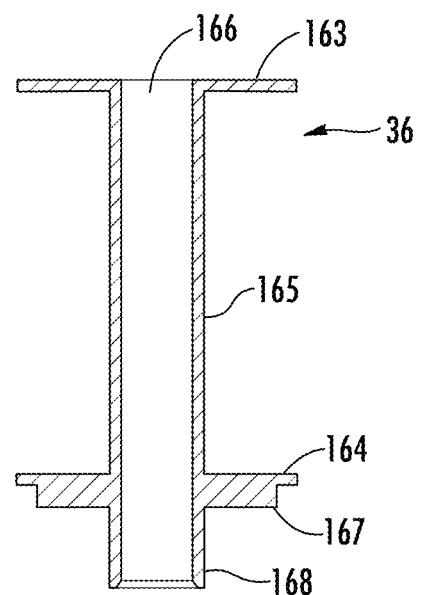

Coil assembly 35 is shown in FIGS. 7A-7D. In particular, FIGS. 7A and 7B illustrate perspective and cross-sectional views of coil assembly 35 having a bobbin 161 and coil 162. FIGS. 7C and 7l) illustrate perspective and cross-sectional views, respectively, of bobbin 161 without solenoid coil attached. Bobbin 161 includes a top cylindrical flange 163 and a bottom cylindrical flange 164 connected by a cylindrical conduit 165 with a though hole 166 therein. Bottom cylindrical flange 164 includes an inward stepped portion 167 for engaging top annular opening 119 of valve base 15. Cylindrical conduit 165 includes an extension 168 extending downward from bottom cylindrical flange 164 for extending into valve base 15, as shown in FIGS. 1 and 2B.

Figure 8A:
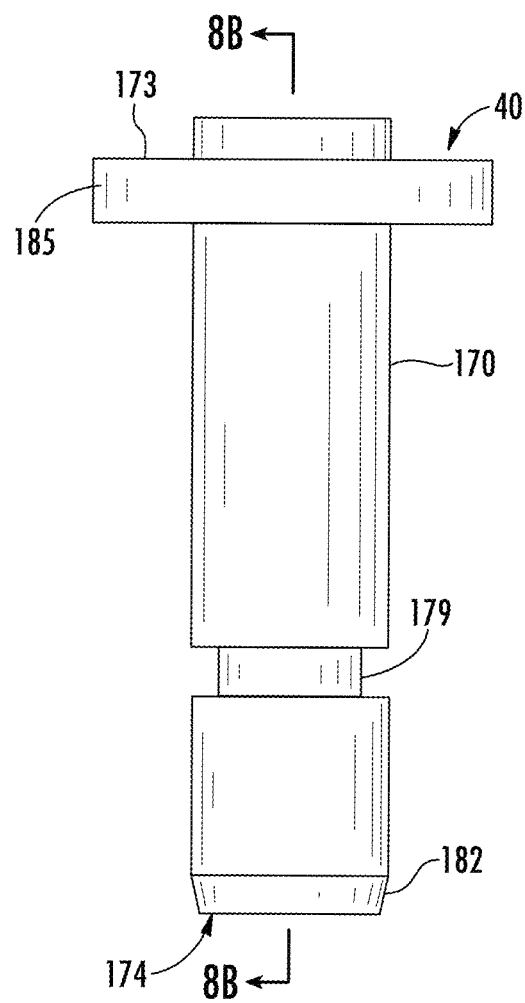
FIGS. 8A-8B are side and cross-sectional views of a magnetic top piece.
Figure 8B:
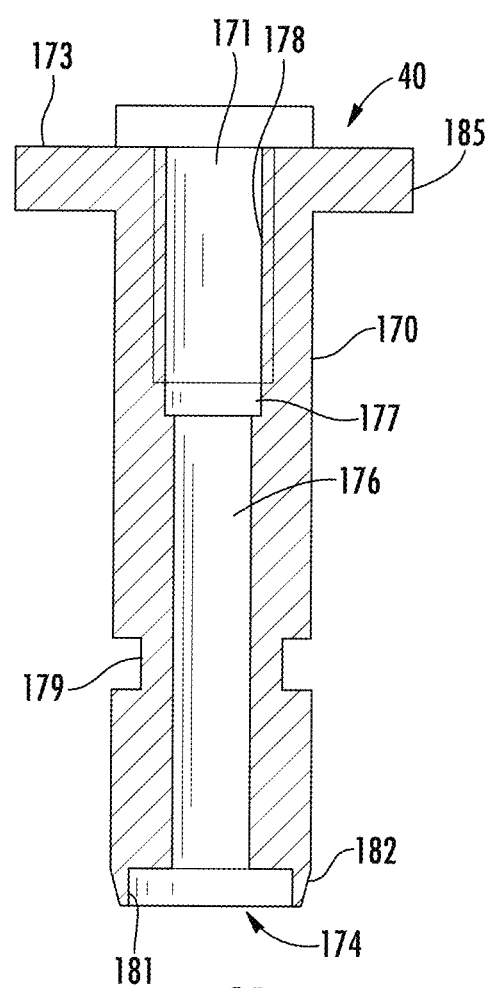
Figure 9A:
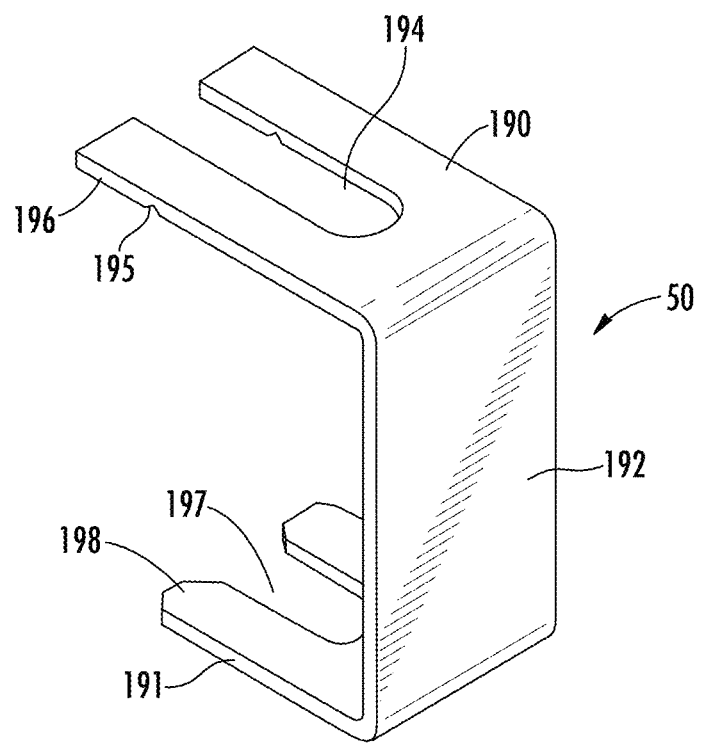
FIGS. 9A-9B are perspective and side views of a magnetic frame.
Figure 9B:
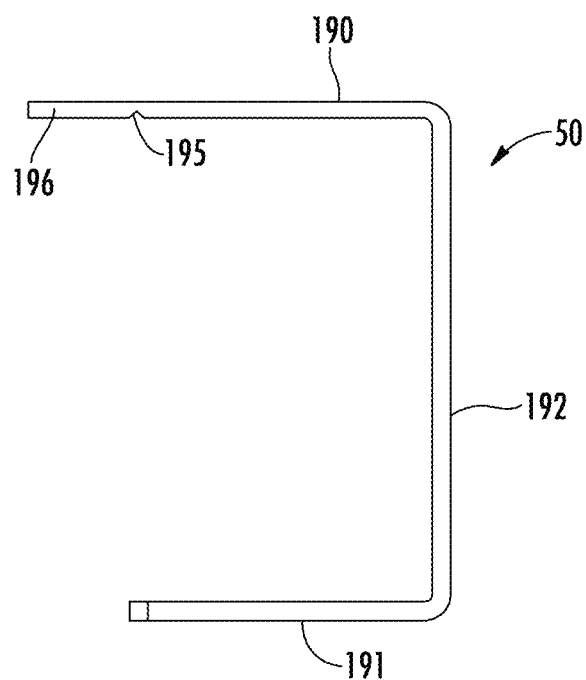

As shown in side and cross-sectional views in FIGS. 8A-8B, respectively, valve assembly 10 further includes a fixed magnetic orifice piece 40 positioned over plunger 20. In general, magnetic orifice piece 40 is made of a ferromagnetic material and is cylindrically shaped with an outer surface 170 and bore 171 formed therein, which extends from a top end 173 to a bottom end 174. Bore 171 includes a lower portion 176, an intermediate width middle portion 177, and a wider upper portion 178. Outer surface 170 includes a groove 179 formed therein for receiving an O-ring 65, as shown in FIG. 1. Magnetic orifice piece 40 also includes a downwardly extending bottom rim 181 having a slanted outer edge 182 and a disk-shaped rim portion 185 extending outwardly from top end 173. Bottom rim 181 of magnetic orifice piece 40 is sized to fit over narrowed cylindrical section 144 of plunger 20. In an assembled configuration, disk-shaped rim portion 185 is positioned between top cylindrical flange 163 of bobbin 161 and magnetic frame 50.

A flux conductor or magnetic frame 50 is provided to complete valve assembly 10. As illustrated in detail in perspective and side views in FIGS. 9A-9B, respectively, magnetic frame 50 has a unitary generally C-shape construction. In particular, magnetic frame 50 includes a top section 190, a bottom section 191, and a side section 192. Top section 190 includes an elongated opening 194 formed therein. A notch 195 may also be formed within a lower surface of top section 190. Projections 196 bend at notch 195 perpendicularly from top section 190 to secure magnetic frame 50 to valve assembly 10. Bottom section 191 also includes an elongated opening 197 forming prongs 198 for engaging slots 118 in valve base 15.

As shown in FIGS. 1-2B, a ring 45 is also provided to secure valve assembly 10 and to sandwich diaphragm 30 between ring 45 and valve base 15. Ring 45 is formed of a magnetic material and serves dual purposes. Ring 45 provides an additional magnetic radial path between plunger 20 and magnetic frame 50 and also functions as a spacer between magnetic frame 50 and coil assembly 35 to hold diaphragm 30 in place.

With reference to FIG. 2B, the fixed magnetic orifice piece 40, axially movable plunger 20, magnetic frame 50, and ring 45 are made of magnetic materials. Plunger 20 and magnetic orifice piece 40 are placed in such a way that an air gap 199 exists between them. A magnetic path is formed by magnetic orifice piece 40, plunger 20 and magnetic frame 50. Spring 55 is used as a biasing member. When solenoid coil 162 is actuated, plunger 20 is attracted towards the magnetic orifice piece 40 and plunger 20 moves to close air gap 99 against spring 55, thus lifting valve poppet 25 which, in turn, allows the pressurized media to pass from inlet port 108 to outlet port 102. In particular, when solenoid coil 162 is energized, a magnetic field goes around flux conductor or magnetic frame 50 so the magnetic field comes through ring 45 and jumps a thin radial air gap 201. After the magnetic field jumps thin radial air gap 201 it goes around magnetic frame 50 and makes contact between magnetic frame 50 and magnetic orifice piece 40 so the magnetic field comes through magnetic top piece 40 and then jumps an air gap 199 between magnetic orifice piece 40 and plunger 20. The magnetic field then flows through plunger 20, thereby creating a magnetic force that pulls plunger 20 towards magnetic orifice piece 40 and compresses spring 55. Depending on the intensity or strength of coil 162, the position of plunger 20 can be held in various positions thus controlling the flow between inlet port 108 and outlet port 102. Valve poppet 25 is connected to plunger 20 so that when plunger 20 is pulled towards magnetic orifice piece 40, valve poppet 25 is lifted off the valve seat.

As shown in FIG. 1, valve poppet 25 is seated on top of valve seat 112 over orifice 111 when valve assembly 10 is in a de-actuated state, so that the media from inlet port 108 is prevented from passing to outlet port 102. Magnetic frame 50 holds together all the parts of valve 10, thus eliminating the need of an additional member to hold the complete assembly. Diaphragm 30, as shown, is sandwiched between plunger 20 and valve poppet 25, separating the fluid path in valve base 15 and an area above diaphragm 30. One side of the diaphragm rests on the valve base orifice 111 and is held in place by bobbin 161 and ring 45, when magnetic frame 50 is inserted in place. Top section 190 of magnetic frame 50 rests on disk-shaped rim portion 185 and secures a top extension 202 of magnetic orifice piece 40 within elongated opening 194 to further secure the valve assembly 10.

Figure 10:
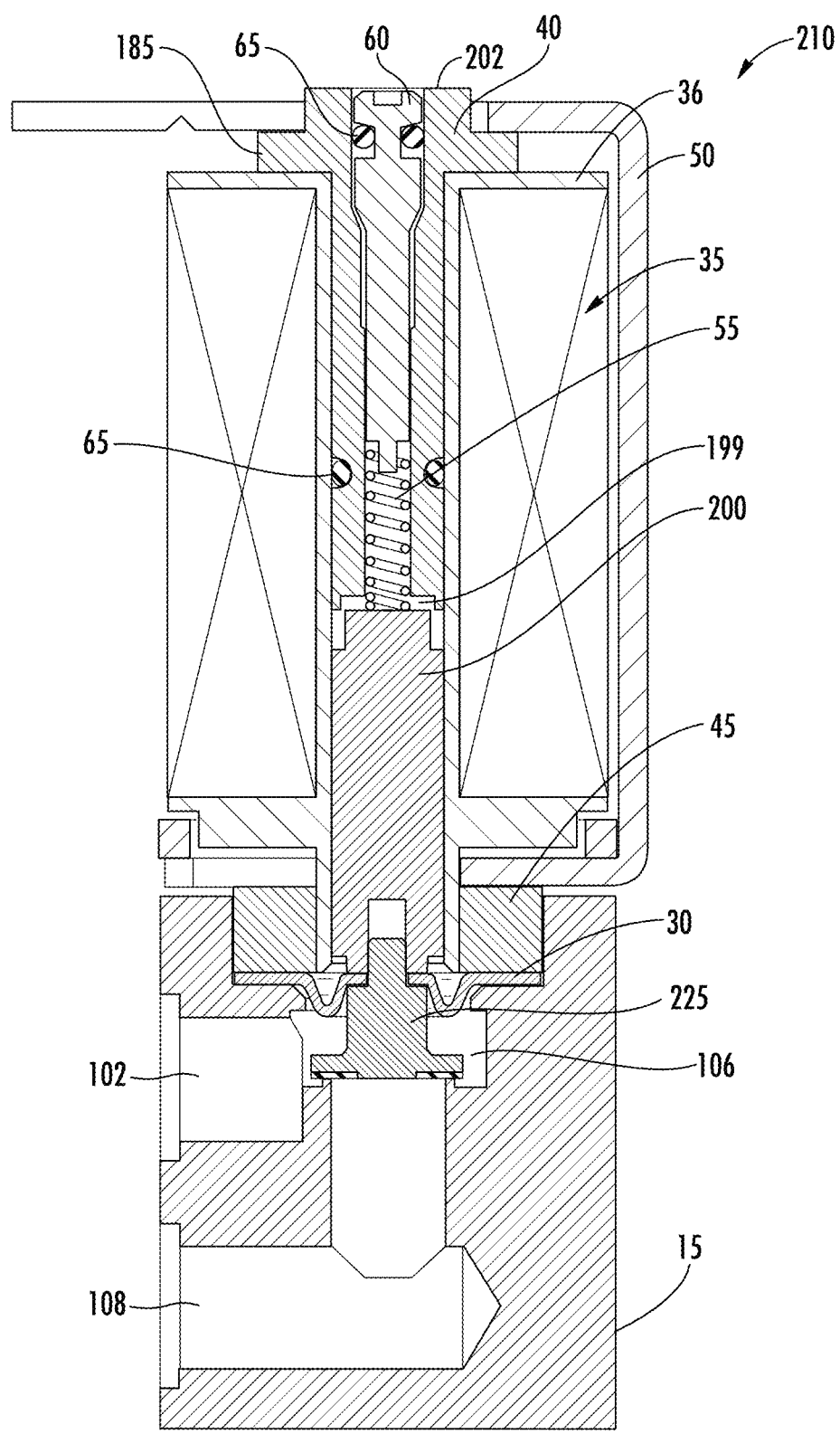
FIG. 10 is a cross-sectional view of an isolation valve assembly 210.

The embodiment shown in FIG. 10, is an isolation valve assembly 210 wherein a valve poppet 225 and plunger 200 are solid and do not include fluid flow apertures therein. Each of the remaining components of valve assembly 210 is consistent with the components described in connection with valve assembly 10 and will not be separately described. When pressurized media is acted on inlet port 108, the forces acted on the bottom of the diaphragm 30 seated on orifice valve seat 112 need to be balanced by the spring force to prevent valve poppet 25 from lifting off valve seat 112. Diaphragm 30 serves in isolating the media from entering interior valve cavity 106. When valve assembly 210 is actuated, plunger 20 is attracted towards magnetic orifice piece 40, against the spring, and valve poppet 25 is lifted off valve seat 112, thereby allowing the media to pass from inlet port 108 to outlet port 102 confining the media in interior valve cavity 106.

Figure 11:
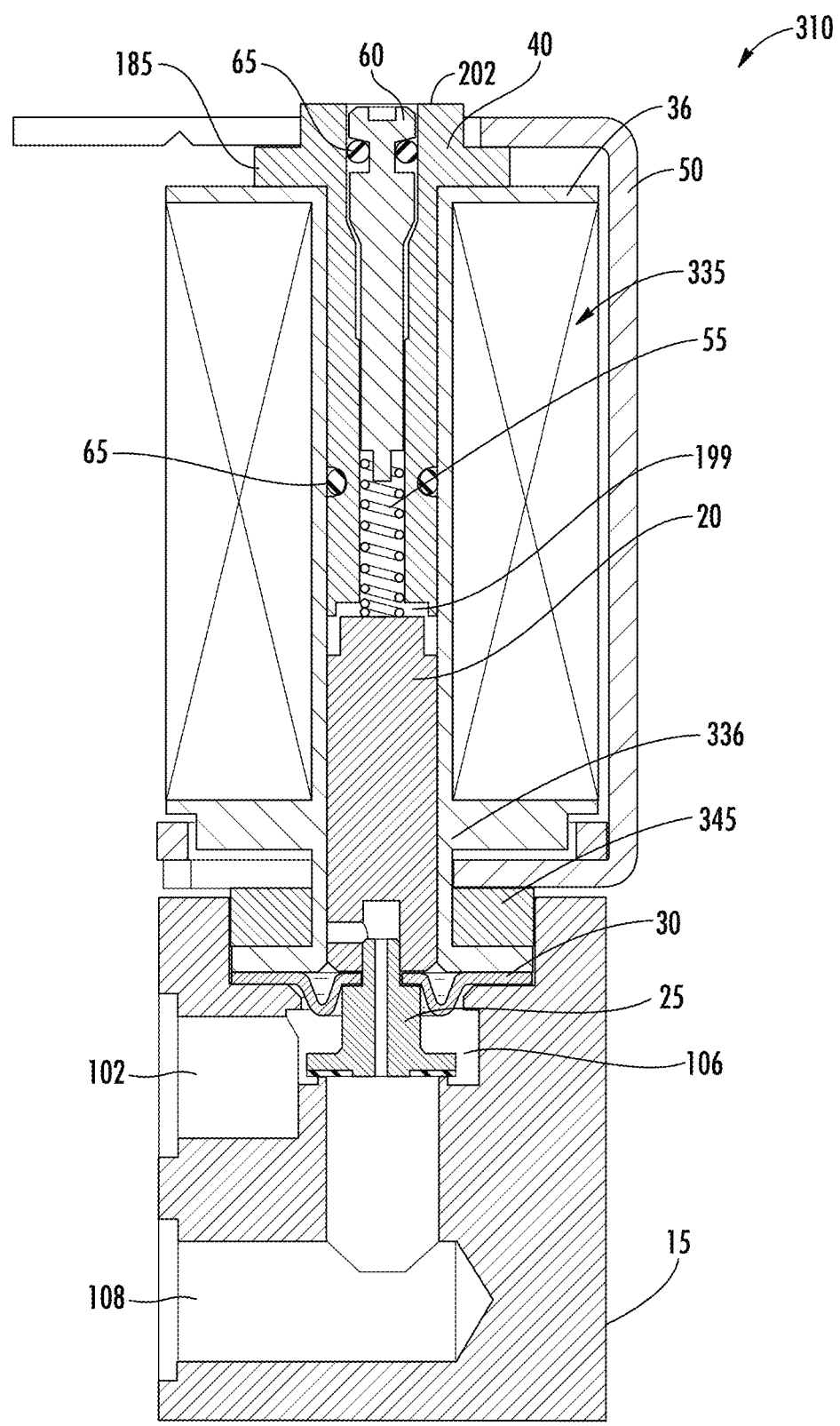
FIGS. 11 and 12 are additional embodiments of a pressure balancing valve assembly 310 and isolation valve assembly 410.
Figure 12:
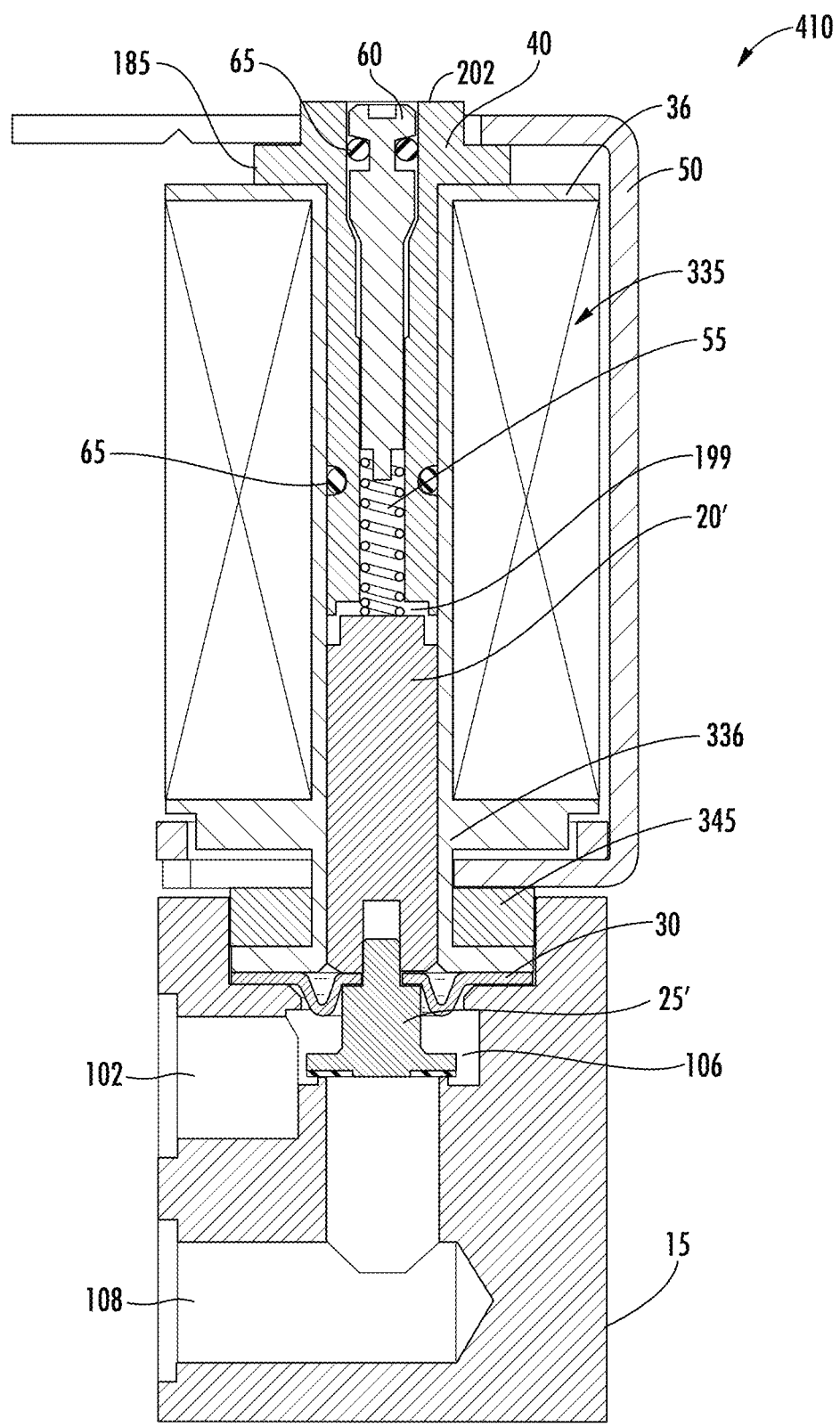

An additional embodiment of a pressure balancing valve assembly 310 is shown in FIG. 11 and an addition embodiment of an isolation valve assembly 410 is shown in FIG. 12. Each of pressure balancing valve assembly 310 and isolation valve assembly 410 include an alternate bobbin 336 and a split ring 345. The remaining components of pressure balancing valve assembly 310 are equivalent to the components described in connection with valve assembly 10. Similarly, the remaining components of isolation valve assembly 410 are equivalent to the components described in connection with isolation valve assembly 210.

Figure 13A:
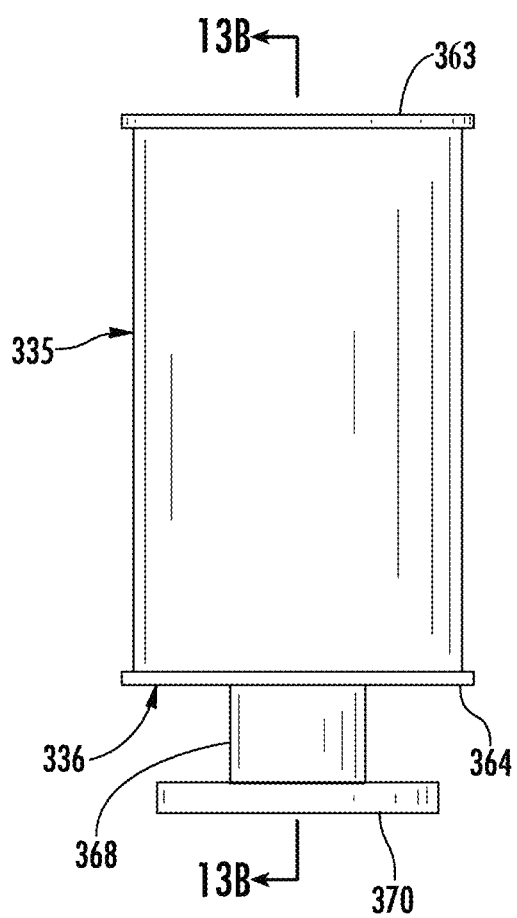
FIGS. 13A and 13B are side and cross-sectional views of an alternate bobbin configuration.
Figure 13B:
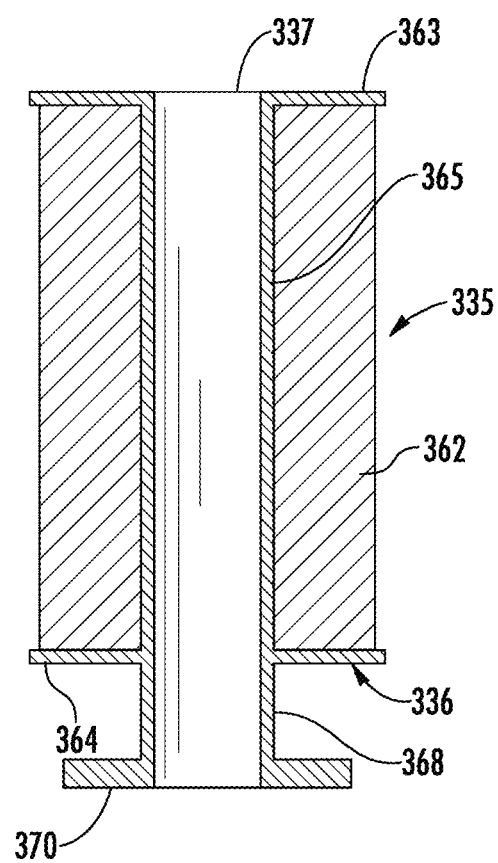

Side and cross-sectional views of alternate bobbin 336 are shown in FIGS. 13A and 13B, in connection with a solenoid coil assembly 335 including a coil 362. Bobbin 336 includes a top cylindrical flange 363 and a bottom cylindrical flange 364 connected by a cylindrical conduit 365 with a though hole 337 therein. Cylindrical conduit 365 includes an extension 368 extending downward towards an engagement flange 370 for extending into valve base 15. Engagement flange 370 is sandwiched between a top surface of diaphragm 30 and a bottom surface of split ring 345, as shown in FIGS. 11 and 12.

Figure 14:
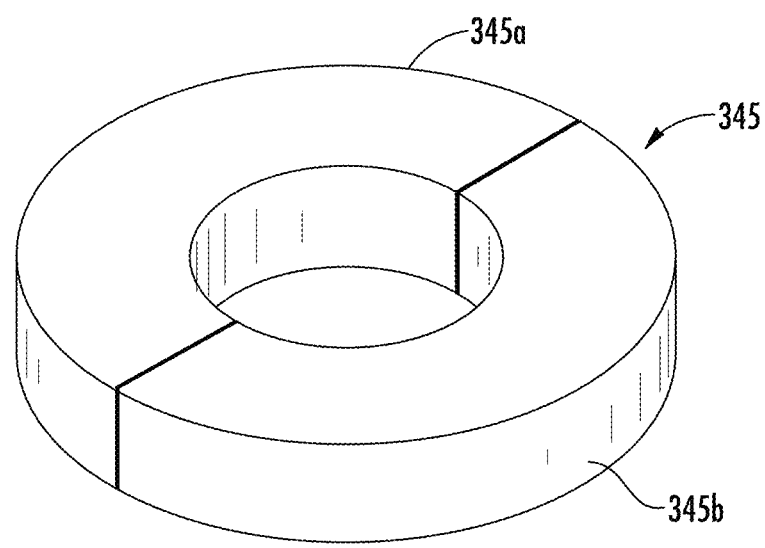
FIG. 14 is an enlarged perspective view of a split ring.

An enlarged perspective view of split ring 345, including first and second halves 345a and 345b, is shown in FIG. 14. Split ring 345 inserted in above engagement flange 370 of bobbin 336. The split ring 345 serves dual purposes. Split ring 345 provides an additional magnetic radial path between the plunger and the magnetic frame and also functions as a spacer between the magnetic frame 50 and bobbin 336 to hold diaphragm 30 in place.

FIGS. 15 and 16 illustrate cross-sectional and exploded views of an additional embodiment of a valve assembly 510 with a modified adjustment screw 560, magnetic orifice piece 540 with a flat top end 542, and magnetic frame 550. The remaining components of pressure balancing valve assembly 510 are equivalent to the components described in connection with valve assembly 310, as shown in FIG. 11. However, it should be understood that alternate embodiments of bobbin and ring may be employed in valve assembly 510. Further, valve assembly 510 may be adapted to be an isolation valve similar to valve assembly 410. Enlarged perspective and side views of the adjustment screw 560 are shown in FIGS. 17A and 17B. Adjustment screw includes shown as a generally cylindrical body with a top slit 562 to allow for tightening of the screw and includes a bottom end 564, a bottom flange 565 and extension 567 for engaging spring 55. A seal or gasket 568 may be positioned in a gap 570 between bottom end 564 and bottom flange 565, as shown in FIG. 15.

Figure 18A:
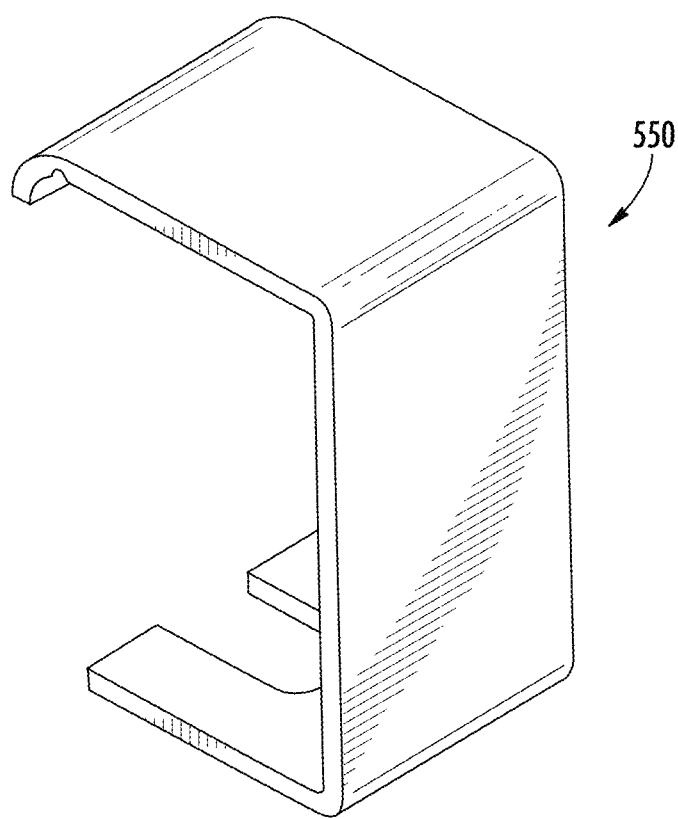
FIGS. 18A and 18B are perspective and side views of a magnetic frame.
Figure 18B:
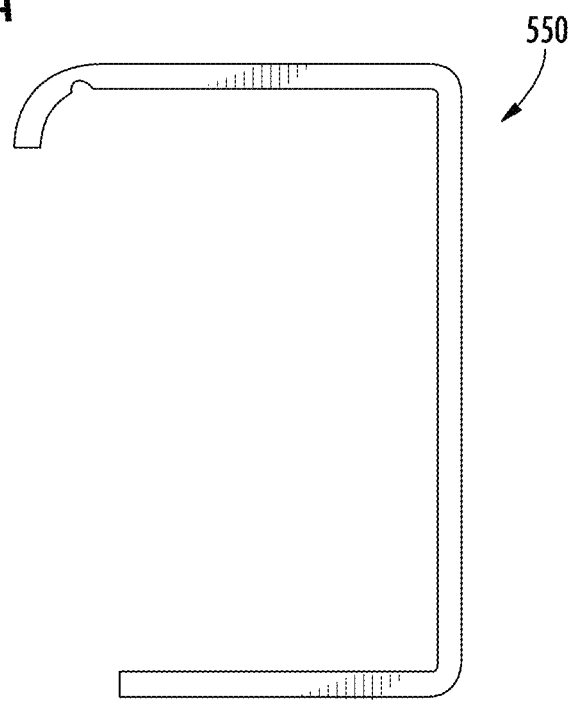

Perspective and side views of the magnetic frame 550 are shown in FIGS. 18A and 18B. The magnetic frame has a solid top surface that covers and contains magnetic orifice piece 540, which has a flat top end rather than an extension, as in previous embodiments. Magnetic frame 550 has a unitary generally C-shape construction. In particular, magnetic frame 550 includes a top section 590, a bottom section 591, and a side section 592. A notch 595 may also be formed within a lower surface of top section 590. Projections 596 bend at notch 595 perpendicularly from top section 590 to secure flux conductor or magnetic frame 550 to valve assembly 510. Bottom section 591 also includes an elongated opening 597 forming prongs 598 for engaging slots 118 in valve base 15.

Figure 19:
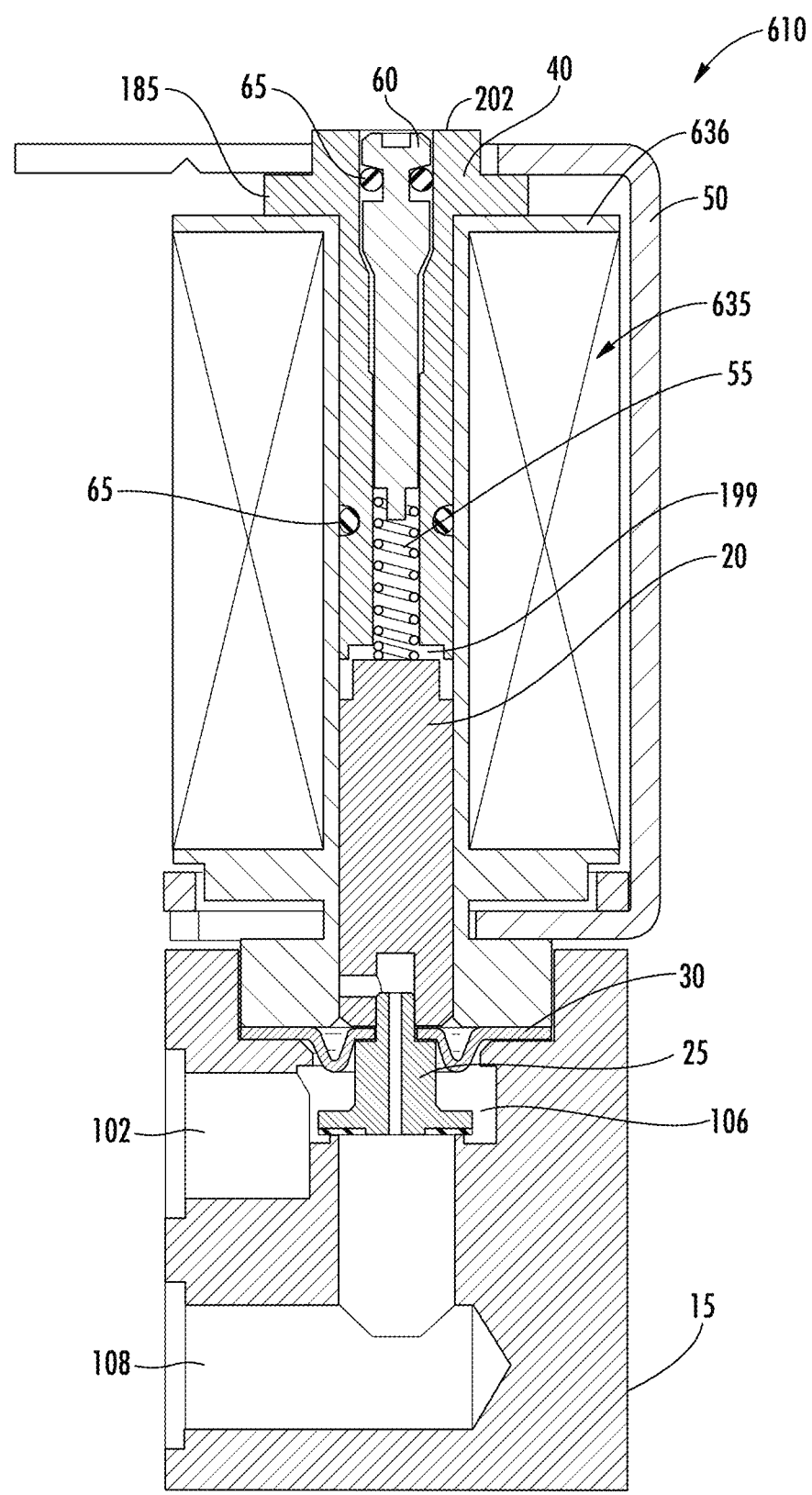
FIG. 19 is a cross-sectional view of an additional embodiment of a valve assembly 610.

FIG. 19 is a cross-sectional view of an additional embodiment of a valve assembly 610. FIGS. 20a and 20b are side and cross-sectional views of a solenoid coil assembly 635 used in connection with valve assembly 610. Each of the remaining components of valve assembly 610 is consistent with the components described in connection with valve assembly 10. Bobbin 636 includes a top cylindrical flange 663 and a bottom cylindrical flange 664 connected by a cylindrical conduit 665 with a though hole 667 therein. Bottom cylindrical flange 664 includes an inward stepped portion 669 for engaging top annular opening 119 of valve base 15. Cylindrical conduit 665 includes an extension 668 extending downward from bottom cylindrical flange 664 to a retaining flange 670 for extending into valve base 15 and retaining diaphragm 30 in place. Retaining flange 670 is sandwiched between a top surface of diaphragm 30 and a section of magnetic frame 50, as shown in FIG. 19.

Figure 21:
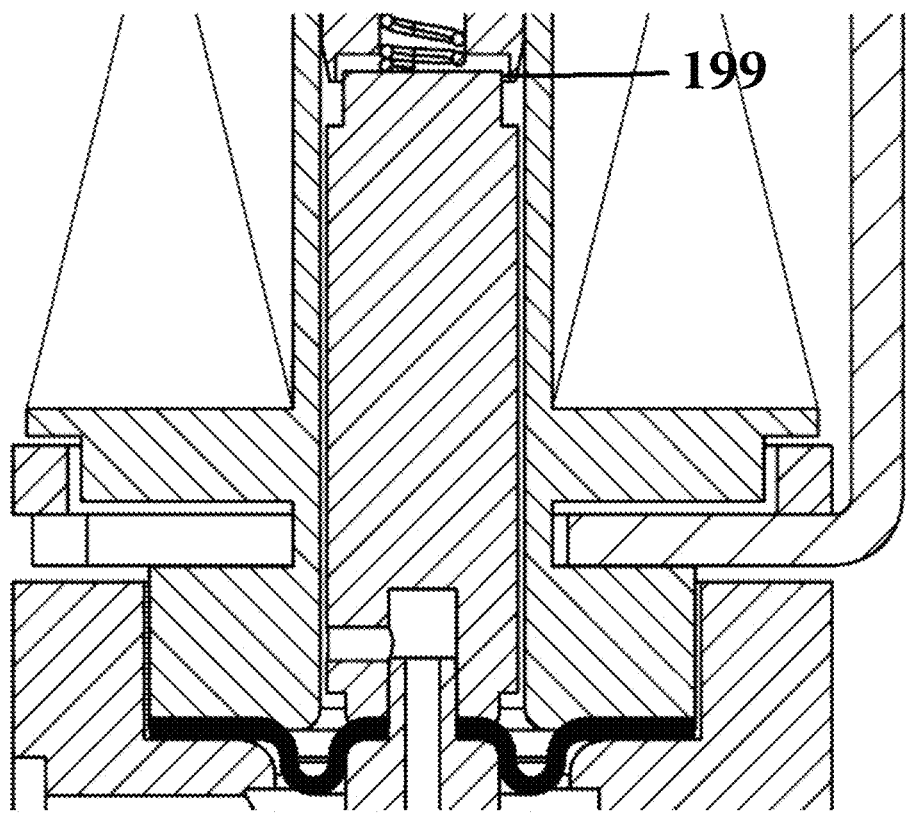
FIG. 21 is an enlarged view of valve assembly 610 showing air gaps in the assembly.

FIG. 21 is an enlarged, cross-sectional view of valve assembly 610 showing that radial gap is maintained between magnetic frame 50 and plunger 20. An air gap 199 is also shown between plunger 20 and magnetic top piece 40.

Although the embodiments in the disclosure have been described primarily with reference to several specific embodiments, it will be apparent to those of ordinary skill in the art that the valve and the components thereof can be modified without departing from the spirit and scope of the invention as claimed.

We claim:

1. A valve assembly comprising:
  a valve base including a top end having slots formed therein, an upper cavity forming an annular ledge, a fluid inlet port and an outlet port with an internal passageway and interior valve cavity there between, said internal passageway terminating at a valve seat;
  a solenoid coil assembly including a bobbin, having a cylindrical conduit, and a solenoid coil;
  a magnetic orifice piece positioned within the conduit and having a tube like body portion with a first end and a second end, a rim portion, and a bore formed there through;
  a plunger positioned within the conduit and being movable within the conduit between a de-actuated position and an actuated position;
  valve poppet having a top cylindrical upstanding portion and a poppet face configured to abut the valve seat;
  a spacer positioned on the ledge of the valve base for holding the diaphragm within the valve base; and
  a diaphragm having a top side, a bottom side, an outer annular flange portion, and an inner annular flange terminating at a diaphragm opening, said diaphragm being positioned within valve base with said outer annular flange portion abutting the ledge of the valve base and the top cylindrical upstanding portion of the poppet extending through the diaphragm opening; and
  a magnetic frame for securing the valve base, solenoid coil assembly, magnetic orifice piece, plunger, valve poppet, diaphragm, and spacer in an assembled configuration without the use of additional fasteners, wherein a magnetic path is formed by magnetic orifice piece, plunger and the magnetic frame and the solenoid coil is configured to be actuated such that the plunger moves towards the magnetic orifice piece, thus lifting the poppet and allowing pressurized media to pass from the inlet port to the outlet port and wherein the magnetic frame has a unitary C-shape construction with a top section, a bottom section, and a side section, wherein the bottom section includes prongs to be secured within the slots formed in the top end of the valve base.

2. The valve assembly according to claim 1, wherein the plunger includes a fluid flow passageway formed therein.

3. The valve assembly according to claim 1, wherein the poppet includes a fluid flow passageway formed therein to allow pressurized media from the inlet port to pass to the top side of the diaphragm and fill a cavity around the plunger, wherein said diaphragm acts as a pressure balance to balance a force that is exerted on the poppet from the pressurized media from the inlet port and a force that is exerted on the top of the diaphragm.

4. The valve assembly according to claim 3, wherein the valve poppet has a stepped cylindrical body with the top cylindrical upstanding portion, a stepped ledge portion, and a lower flange portion forming the poppet face.

5. The valve assembly according to claim 4, wherein the diaphragm further includes an annular U-shaped portion extending downwardly towards the interior valve cavity.

6. The valve assembly of claim 5, wherein said bobbin has a top flange and a bottom flange connected by the cylindrical conduit, said cylindrical conduit including an extension projecting from the bottom flange for extending into the valve base.

7. The valve assembly of claim 6, wherein said rim portion of the magnetic orifice piece extends proximate to the first end of the body portion and having a top side and a bottom side, said body portion of the magnetic orifice piece further includes an upper section extending on a first side of the rim portion and an elongated lower portion extending on a second side of the rim portion and being positioned within the cylindrical conduit of the bobbin with the second side of the rim portion abutting the top flange of the bobbin.

8. The valve assembly according to claim 7, wherein the plunger includes a first end, a second end, and a cylindrical sidewall, said plunger positioned within the conduit of the bobbin such that the first end of the plunger is adjacent to the second end of the magnetic orifice piece.

9. The valve assembly according to claim 8, further comprising a biasing member positioned within the bore of the magnetic orifice piece for biasing the plunger away from the magnetic orifice piece when the solenoid coil is in a de-actuated state, further wherein said spacer is formed of a magnetic material and configured to provide a magnetic radial path between the plunger and the frame.

10. The valve assembly according to claim 1, wherein the top section of the magnetic frame engages the upper section of the magnetic orifice piece to further secure and restrict rotation of the valve assembly.

11. A valve assembly comprising:
  a valve base including a top end having slots formed therein, an upper cavity forming an annular ledge, a fluid inlet port and an outlet port with an internal passageway and interior valve cavity there between, said internal passageway terminating at a valve seat;
  a solenoid coil assembly including a bobbin and a solenoid coil, said bobbin having a top flange and a bottom flange connected by a cylindrical conduit, said cylindrical conduit including an extension projecting from the bottom flange for extending into the valve base;
  a magnetic orifice piece having a tube like body portion with a first end and a second end, a rim portion, and an bore formed there through, said rim portion extending proximate to the first end of the body portion and having a top side and a bottom side, said body portion further including an upper section extending on a first side of the rim portion and an elongated lower portion extending on a second side of the rim portion and being positioned within the cylindrical conduit of the bobbin with the second side of the rim portion abutting the top flange of the bobbin;

a plunger having a first end, a second end, and a cylindrical sidewall, said plunger positioned within the conduit of the bobbin such that the first end of the plunger is adjacent to the second end of the magnetic orifice piece, said plunger being movable within the conduit between a de-actuated position and an actuated position;

valve poppet having a stepped cylindrical body with a top cylindrical upstanding portion, a stepped ledge portion, and a lower flange portion forming a poppet face, said poppet face being configured to abut the valve seat;

a diaphragm having a top side, a bottom side, an outer annular flange portion, an annular U-shaped portion, and an inner annular flange terminating at a diaphragm opening, said diaphragm is positioned within valve base with said outer annular flange portion abutting the ledge of the valve base, said annular U-shaped portion extending downwardly towards the interior valve cavity, and the inner annular flange abutting the stepped ledge portion of the poppet with the top cylindrical upstanding portion of the poppet extending through the diaphragm opening;

a spacer positioned on the ledge of the valve base for holding the diaphragm within the valve base; and a magnetic frame for securing the valve base, solenoid coil assembly, magnetic orifice piece, plunger, valve poppet, diaphragm, and spacer in an assembled configuration without the use of additional fasteners, wherein a magnetic path is formed by magnetic orifice piece, plunger and the magnetic frame and the solenoid coil is configured to be actuated such that the plunger moves towards the magnetic orifice piece, thus lifting the poppet and allowing pressurized media to pass from the inlet port to the outlet port and wherein the magnetic frame has a unitary C-shape construction with a top section, a bottom section, and a side section, wherein the bottom section includes prongs to be secured within the slots formed in the top end of the valve base.

12. The valve assembly according to claim 11, wherein the plunger includes a fluid flow passageway formed between said second end and said sidewall.

13. The valve assembly according to claim 12, wherein the poppet includes a fluid flow passageway formed therein to allow pressurized media from the inlet port to pass to the top side of the diaphragm and fill a cavity around the plunger, wherein said diaphragm acts as a pressure balance to balance a force that is exerted on the poppet from the pressurized media from the inlet port and a force that is exerted on the top of the diaphragm.

14. The valve assembly according to claim 11, further comprising a biasing member positioned within the bore of the magnetic orifice piece for biasing the plunger away from the magnetic orifice piece when the solenoid coil is in a de-actuated state, further wherein said spacer is formed of a magnetic material and configured to provide a magnetic radial path between the plunger and the frame.

15. The valve assembly according to claim 14, wherein a radial air gap exists between said plunger and said magnetic orifice piece.

16. The valve assembly of claim 11, wherein the top section of the magnetic frame engages the upper section of the magnetic orifice piece to secure and restrict rotation of the valve assembly.

17. A valve assembly comprising:
a valve base including a top end having slots formed therein, an upper cavity forming an annular ledge, a fluid inlet port and an outlet port with an internal passageway and interior valve cavity there between, said internal passageway terminating at a valve seat;

a solenoid coil assembly including a bobbin, having a cylindrical conduit, and a solenoid coil;

a magnetic orifice piece positioned within the conduit and having a tube like body portion with a first end and a second end, a rim portion, and a bore formed there through;

a plunger positioned within the conduit and being movable within the conduit between a de-actuated position and an actuated position;

valve poppet having a top cylindrical upstanding portion and a poppet face configured to abut the valve seat;

a diaphragm having a top side, a bottom side, an outer annular flange portion, and an inner annular flange terminating at a diaphragm opening, said diaphragm being positioned within valve base with said outer annular flange portion abutting the ledge of the valve base and the top cylindrical upstanding portion of the poppet extending through the diaphragm opening;

a spacer positioned on the ledge of the valve base for holding the diaphragm within the valve base; and a magnetic frame for securing the valve base, solenoid coil assembly, magnetic orifice piece, plunger, valve poppet, diaphragm, and spacer in an assembled configuration without the use of additional fasteners, wherein a magnetic path is formed by magnetic orifice piece, plunger and the magnetic frame and the solenoid coil is configured to be actuated such that the plunger moves towards the magnetic orifice piece, thus lifting the poppet and allowing pressurized media to pass from the inlet port to the outlet port and wherein the magnetic frame has a unitary C-shape construction with a top section, a bottom section, and a side section.

* * * * *